Jan. 29, 1929.

G. FRIES 1,700,612

CHANGE SPEED GEAR

Filed Feb. 4, 1925

Inventor
Gustave Fries
By [signature] Atty.

Patented Jan. 29, 1929.

1,700,612

UNITED STATES PATENT OFFICE.

GUSTAVE FRIES, OF THAON, FRANCE.

CHANGE-SPEED GEAR.

Application filed February 4, 1925, Serial No. 6,866, and in Belgium February 8, 1924.

My invention relates to a change speed gear designed to ensure progressively and gradually the speed variations in a driving gear.

The change speed gear according to the present invention comprises a driving shaft carrying upon its end a pinion engaging with any number of satellite wheels, three for instance, loose upon axes carried upon a feed plate mounted upon the receiving shaft which is itself mounted on the same axis as the driving shaft; opposite the satellite wheels are fixed crank pins acting as crank shafts upon rings movable upon an eccentric with varying eccentricity through which the driving shaft passes freely but which is independent of its movement and is fixed in space. Each crank pin can be connected to the corresponding satellite wheel during a part of the revolution of the driving shaft by means of a clutch device. This system allows, by a constant speed of the driving shaft, of producing a whole series of different speeds of the transmitting receiving shaft.

The appended drawing shows by way of example a mode of construction of the invention.

The change speed gear constructed according to the present invention comprises a driving shaft $a$ upon the end of which is keyed a pinion $b$; this shaft $a$ passes freely through an eccentric having a varying eccentricity which consequently is independent of same and immovable in space.

The eccentric is stationary and consists of a part $c$ through which passes the driving shaft and of a second part $c^1$ which may be adjustably operated by any desired means, and around which part $c^1$ is placed an eccentric strap $c^2$ carrying the crank pins controlling the satellite wheels as will be hereafter explained.

The inner and outer profiles of the two parts $c$, $c^1$ are eccentric circumferences and the eccentricity is determined by the outer profile of part $c^1$ relatively to the axis of the driving shaft $a$.

In the axis of the driving shaft $a$ is mounted a receiving or driven shaft $d$ upon the end of which is keyed a plate $e$ carrying the axes $f$ of a certain number of satellite wheels $g$, $g^1$, $g^2$, three in the present case. In this mode of execution the face of the satellite wheels opposite to plate $e$ is made hollow in order to form recesses for the reception of clutch cones $h$ actuated by arms $i$ acted upon by appropriate faces of a cam $j$ secured to and moving with the driving shaft $a$ to push successively a cone $h$ in the recess of a satellite wheel at each third of the revolution of plate $e$, both the other satellite wheels being free.

The outer movable ring or strap $c^2$ of the eccentric carries crank pins $k$ forming crank shafts passing through openings in the clutch cones $h$, so that every crank pin may be rendered integral with its satellite wheel when the corresponding cone is engaged therein.

Figure 1:
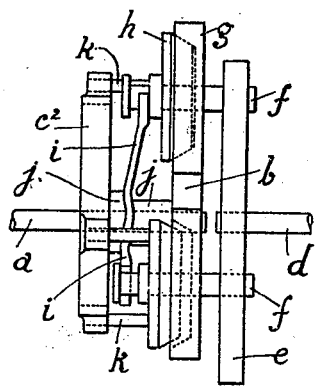
Fig. 1 is a side view of a device in which the connection of the crank pins of the eccentric strap is made by means of clutch cones.
Figure 2:
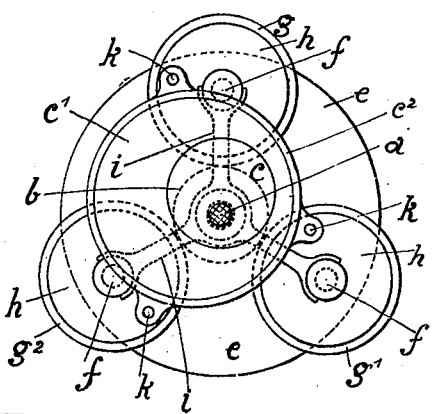
Fig. 2 is a front view of same.
Figures 3, 4, 5:
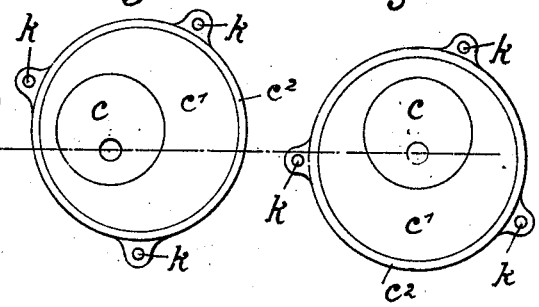
Figs. 3, 4 and 5 show three positions taken by the eccentric.
Figure 6:
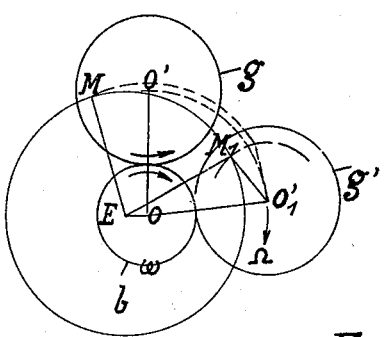
Figs. 6, 7 and 8 are theoretical diagrams designed to illustrate the motion produced by the present device.

The mode of operation is as follows: The continuous circular motion imparted to the driving shaft $a$ is transmitted by means of a pinion $b$ to the satellite wheels $g$, $g^1$, $g^2$, one only of the latter, the wheel $g$ for instance as shown in Fig. 1, being connected with the eccentric strap $c^2$ by the corresponding cone being engaged in said wheel $g$. The engagement of this cone with the satellite gear has been made by one of the arms $i$ and the cone oscillated by the action of a face of the cam $j$ that turns with the shaft $a$. While the satellites $g^1$ and $g^2$ turn freely on their axes $f$, the satellite $g$ is clutched to the cone $h$ and is caused to revolve about the central driving shaft $a$ and driven shaft $d$ to which plate $e$ is secured, but the satellite $g$ is constrained on the other hand to make a certain rotation about its own axis $f$ by the action of the crank shaft $k$ which is displaced with strap $c^2$ on the periphery of the eccentric $c^1$. Consequently the speed of rotation of the plate $e$ and driven shaft $d$ is less than the speed of rotation of driving shaft $a$. The rotation of the satellite $g$ about its own axis varies then with the eccentricity of $c^1$ and consequently the rotation of the system $e$—$d$ also varies with the eccentricity. This motion of the driving shaft is divided in two parts: a circular motion or rotation of the satellite wheel $g$ on its axis and a circular motion or revolution of all the axes of the satellite wheels carried by plate e on its center d; the satellite wheels $g^1$, $g^2$ rotating loosely on their axes. The circular motion or revolution of the satellite $g$ is limited by the corresponding crank pin moving with the strap $c^2$ upon the outer periphery of eccentric $c^1$; it varies with the value of eccentricity and consequently the circular revolving motion of the plate $e$ varies also with said value of eccentricity. When the satellite wheel $g$ is out of action owing to its cone being disengaged, the satellite wheel $g^1$ is actuated and so on.

Although the operation of the present device has been described in view of the employment of clutch cones for temporarily connecting the crank pins to their corresponding satellite wheel, it is evident that other appropriate means could be used without departing from the principle of the invention.

According to principles of kinematics the motion produced may be explained as follows:—

Supposing that the pinion $b$ having O for its center revolves at a constant angular speed $\varpi$. Supposing that a satellite wheel $g$ engaging with $b$ and having O' as its center is connected to O by a straight line OO' having a constant length. The graph of the points O' will be a circumference having a radius OO'.

Supposing E fixed in space as being a center of eccentricity for a value of eccentricity OE (constant for every speed ratio).

Supposing M a point of satellite $g$ distant from MO' and connected to E by the straight line ME, said lengths being constant.

The graph of the points M will be a circumference having a radius ME.

OO' ME form a quadrilateral figure having a fixed base OE with sides which remain equal and varying angles.

Figure 7:
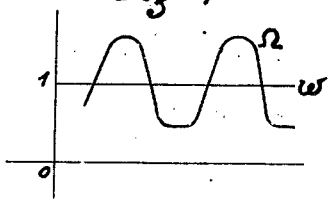

Considering a position such that O' be at O' and M at $M_1$, and considering on the other part that $b^1$ and $g$ revolve without sliding, the value $\Omega$ which is the angular speed of OO' revolving on O relatively to $\varpi$ may be graphically determined, it will give a curve as shown in Fig. 7.

Figure 8:
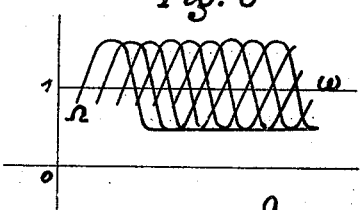

The time is plotted as abscissa and the number of turns per second or angular velocity in ordinates, taking $\varpi=1$ a periodical curve of $\Omega$ will be obtained. For each half period the speed will be greater than $\varpi$ and for the other half period $\Omega$ will be smaller than $\varpi$. The construction may be arranged so that the curve is considerably flattened in this half period. Taking $n$ satellites displaced by $$\frac{\pi}{n}$$

there will be obtained a succession of curves the flattened portions of which (in the proximity of the minimum of $\Omega$) may coincide with a straight line (Fig. 8). If by any means (selectors, gears, cams, clutches, etc.) point M is made integral with the satellite solely in the flattened part of the curve, thus there will obtain for OO' a constant angular speed $\Omega$ graphically designated by said straight line.

It will be easily understood that a speed $\Omega$ will correspond to every value of OE and in the special case where OE is null, $\Omega=\varpi$ it will be seen that the whole system revolves on O at the same angular speed, the mechanical efficiency is great and may be compared to the through drive of an automobile driving gear.

Having now described and ascertained the nature of my said invention and in what manner the same is to be performed, I declare that what I claim is:—

1. A progressive change speed gear comprising: a driving shaft, a pinion secured to and carried upon the end of same, satellite wheels in gear with said pinion, a driven plate carrying the satellite wheels, a receiving shaft upon which the driven plate is keyed, a stationary eccentric the eccentricity of which may be varied, a movable strap carried by said eccentric; crank pins upon said strap and means to temporarily and successively operatively connect the crank pins with the satellite wheels placed opposite each of them.

2. A progressive change speed gear comprising: a driving shaft, a pinion secured to and carried upon the end of same, satellite wheels in gear with said pinion, a driven plate carrying the satellites, a receiving shaft upon which the driven plate is keyed, a stationary eccentric, the eccentricity of which may be varied comprising a circular first part out of centre with the driving shaft that passes through it and independent of the movement of the latter and a second part also of circular shape eccentric relatively to said first part, a movable strap carried by the second part, crank pins upon said strap, a cam secured to said driving shaft and means actuated thereby to operatively connect temporarily and successively the crank pins with their corresponding satellite wheels.

3. A progressive change speed gear comprising a driving shaft, a pinion secured to and carried upon the end of same, satellite wheels in gear with said pinion, a driven plate carrying the satellite wheels, a receiving shaft upon which the driven plate is keyed, a stationary eccentric of which the eccentricity may be varied comprising a circular first part out of centre relatively to the driving shaft that passes through it and independent of the movement of the latter, and a second part having also a circular shape and out of centre with the said first part, a movable strap mounted upon said second part, crank pins carried by said strap, clutch cones for the satellites in which the crank pins are engaged, oscillating arms designed to control the engagement of the cones in the satellite wheels, a cam fixed to the driving shaft actuating the oscillating arms in order to produce the engagement of the satellite wheels one after the other in their corresponding clutch cone.

In testimony that I claim the foregoing as my invention, I have signed my name.

GUSTAVE FRIES.